H. T. GRAVES.
AUTOMOBILE SEAT AND BACK CONSTRUCTION.
APPLICATION FILED JULY 17, 1917.

1,282,687. Patented Oct. 22, 1918.
2 SHEETS—SHEET 1.

WITNESSES
Frederick L. Fox,
D. B. Phillips.

INVENTOR
Henry T. Graves.
BY Victor J. Evans.
ATTORNEY

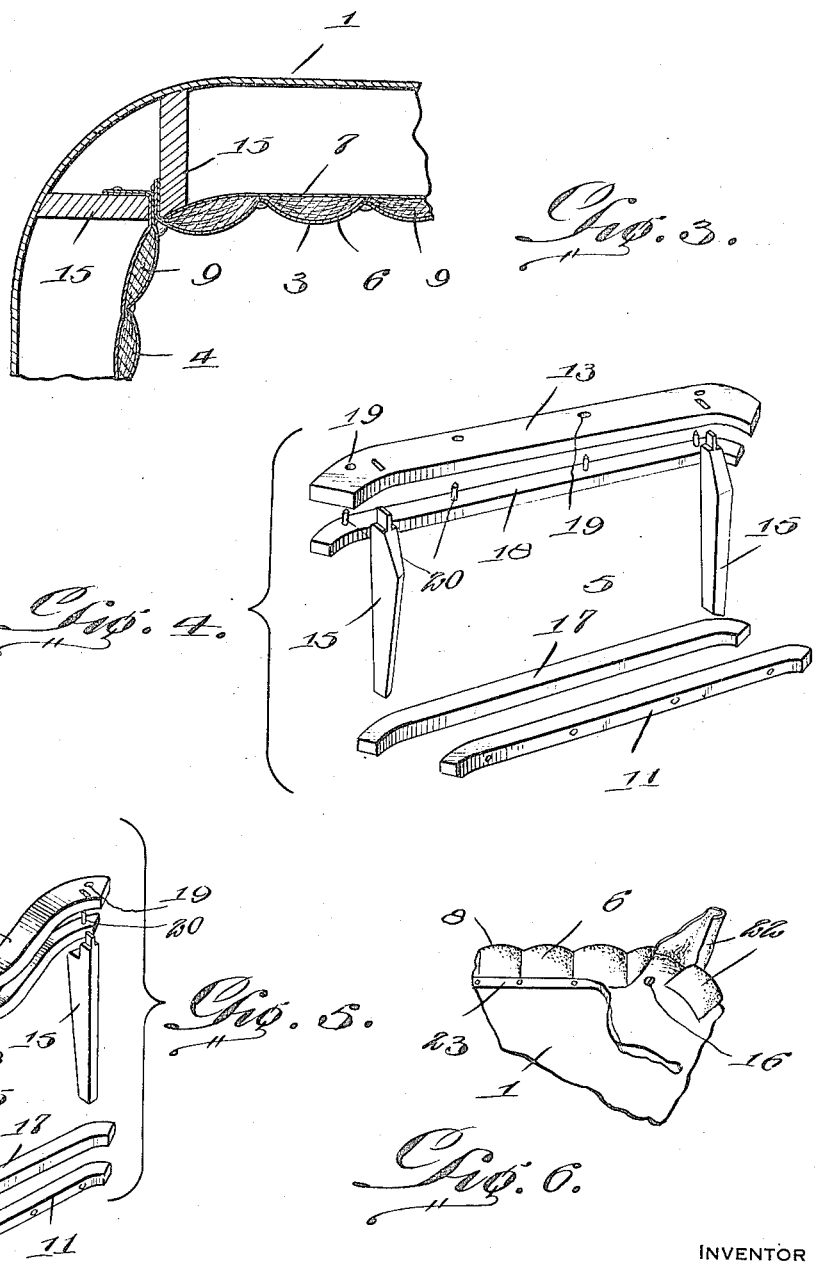

UNITED STATES PATENT OFFICE.

HENRY T. GRAVES, OF ELKHART, INDIANA.

AUTOMOBILE SEAT AND BACK CONSTRUCTION.

1,282,687.　　　　　　Specification of Letters Patent.　　Patented Oct. 22, 1918.

Application filed July 17, 1917.　Serial No. 181,117.

*To all whom it may concern:*

Be it known that I, HENRY T. GRAVES, a citizen of the United States, residing at Elkhart, in the county of Elkhart and State of Indiana, have invented new and useful Improvements in Automobile Seats and Back Constructions, of which the following is a specification.

This invention pertains to improvements in vehicle bodies and methods of constructing the same, and has particular reference to an improved seat back construction for automobiles.

The principal object contemplated in the present invention is the provision of a seat back construction whereby the back may be formed in separate sections and assembled in the body by comparatively inexperienced workmen, thereby decreasing the cost of production. Another object is an improved arrangement of the parts comprising the back facilitating assembly thereof and enabling the back to be readily removed from the body for repair or cleaning.

With these and other purposes in view, I have embodied my invention in the construction, combination and arrangement of parts described in the specification below, more definitely set forth in the claim, and depicted in the drawings in which—

Fig. 3 is a transverse sectional view showing construction of adjoining portions of the panels composing the back.

Fig. 4 shows frame members for a back panel as disassociated.

Fig. 5 shows frame members for an arm panel as disassociated.

Fig. 6 illustrates constructional details.

Figure 1:
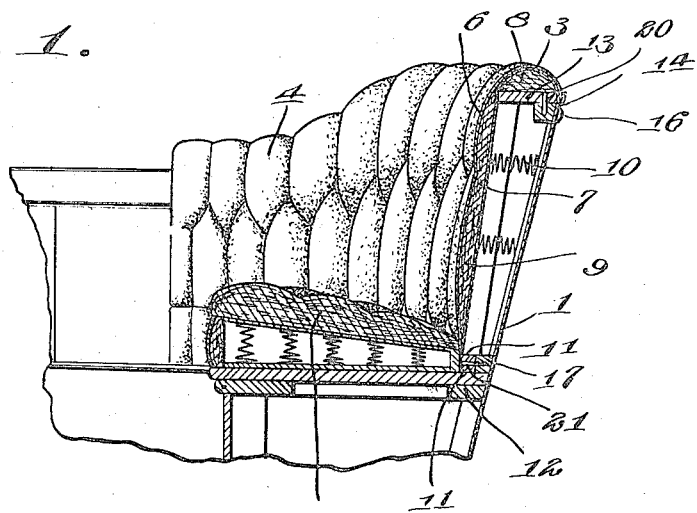
Figure 1 is a fragmentary longitudinal section through an automobile body having the seat back comprised in this invention applied thereto.
Figure 2:
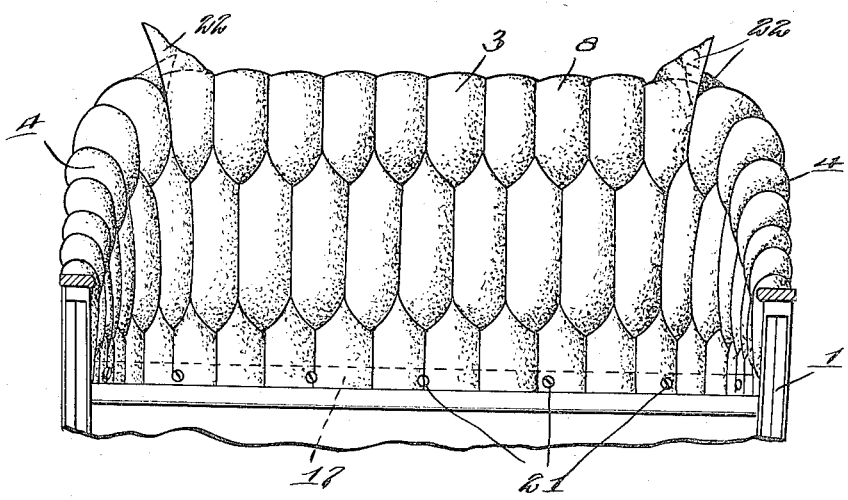
Fig. 2 is a front elevation showing the seat back partially assembled.

Referring to the drawings more specifically, I have chosen for purposes of illustration an automobile having a body 1 of sheet metal construction, surrounding a seat 2 and adapted to support the back and side-arm upholstery thereof. It should be understood, however, that the present invention is not restricted in application to automobiles or even to vehicles, but may be applied with equal success to many other upholstered articles. In accordance with the invention, upholstery is formed in three separate panels comprising a center panel 3 extending upwardly from the rear of the seat 2 and side-arm panels 4 for disposition on either side of the seat. It should be understood that the number of panels shown and the particular arrangement is not essential to the invention, as the construction may be equally well applied to individual seats or to those for a greater number of persons, and to seats of a variety of forms.

Each panel comprises a wooden frame 5 having a leather or other flexible facing 6 stretched thereon over a cloth backing 7, the frame, facing and backing being attached and secured together by any of several methods well known in the art. The facing 6 is preferably carried over the top of the frame 5 for attachment to the rear edge and the space above the frame packed with filling material to constitute a roll 8 blending with the lines of the body whereby the appearance is improved. Hair or similar filling material is also inserted between the facing 6 and backing 7 to form cushions 9, and the usual springs 10 are disposed behind the backing 7 for increasing the resiliency of the cushions. In the present instance each frame 5 comprises a bottom bar 11 adapted to extend parallel and in juxtaposition to the seat frame 12, and a top bar 13 which may be steamed and bent or otherwise shaped corresponding to the upper edge 14 of the body. For uniting the top and bottom bars 11 and 13, vertical members 15 are properly secured thereto as by mortise and tenon joints, and the adjacent members 15 of adjoining panels are arranged to overlap or interlock, preferably in the manner shown, whereby a neater joint is secured and the panels are more firmly held in position. Attached inwardly of the body 1 immediately above the seat frame 12 by screws 16, or other suitable means, is a bow-piece or rail 17 preferably, but not necessarily, of wood and adapted for face to face contact with the bottom panel-bar 11, and similarly attached to the body adjacent the upper edge 14, is a second bow-piece or rail 18, adapted to receive thereon and support the top panel-bar 13. For maintaining the panels in position, each panel-bar 13 is formed with openings 19 and suitable register-pins 20 are inserted in the rail 18 for engagement therewith; and each bottom panel-bar 11 is provided with means shown as wood screws 21 whereby it is held in clamping engagement with the lower bow-piece 17. It will be seen that in this method of assembling the back, the panels need merely be dropped into place with openings 19 coinciding with pins 20, and screws 21 inserted, whereby the process of assembly occupies a mere fraction of the time hitherto required.

In the process of manufacture, the panels may conveniently be made upon machines, as customarily practised in the art, the facing 6 being left temporarily loose at the corners 22, if desired, for attachment after assembling to insure a neat joint. The panels are then disposed in the body and secured in the particular manner adopted, whereupon the corners 22 may be tacked or otherwise secured in position, and tape 23 or other material may be applied to conceal the joint at the junction of the panels and the edge 14 of the body.

While I have here delineated and described one embodiment of my invention for purposes of illustration, it is to be understood that I do not limit myself to the particular form disclosed, but reserve the right to variation and modification within the spirit of the invention as indicated by the scope of the accompanying claim.

I claim:—

A panel structure for seats and backs, comprising a frame comprising contacting strips arranged edge to edge and secured together, with one of said strips adapted to be secured as a vehicle holding member, uprights rising from one of said strips, a comparatively wide upper strip interfitting with and supported by the uprights, and a supporting strip adapted to be secured to the vehicle to underlie the wide strip, said supporting strips having upright pins to removably engage openings in said wide strip, whereby to position the latter.

In testimony whereof I affix my signature.

HENRY T. GRAVES.